J. Old,
Gum Scrubber.
No. 86,097. Patented Jan. 19, 1869.
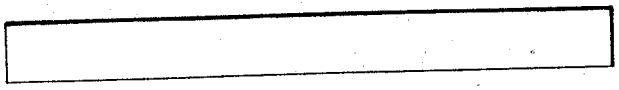
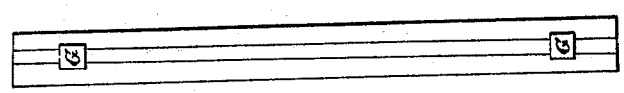
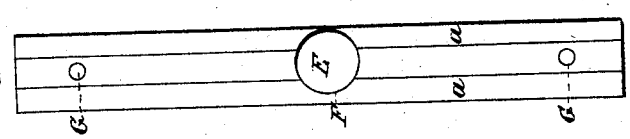
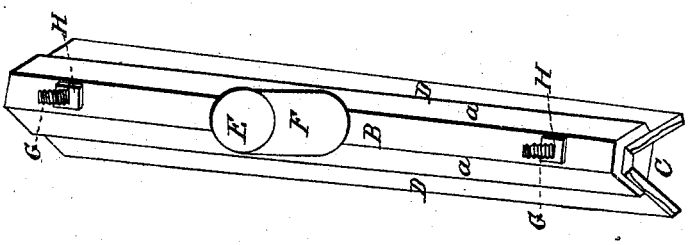
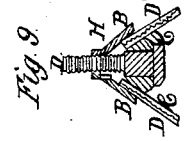
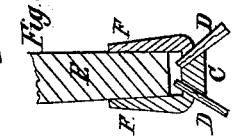
Witnesses,
N. R. Hill
Joseph Shearer
Inventor.
Joseph Old

UNITED STATES PATENT OFFICE.

JOSEPH OLD, OF READING, PENNSYLVANIA.

IMPROVED GUM SCRUBBER.

Specification forming part of Letters Patent No. 86,097, dated January 19, 1869.

*To all whom it may concern:*

Be it known that I, JOSEPH OLD, of Reading, in the county of Berks and State of Pennsylvania, have invented a new and useful Improvement in Scrubbers; and I do hereby declare that the following is a full, clear, and exact description of the construction of the same, reference being had to the annexed drawings, making a part of this specification, in which—

Figure I is a perspective view of the scrubber; Fig. II, a plan view. Fig. III is a transverse section through part of the scrubber; Figs. IV and VI, plan views of detached parts of the scrubber. Fig. V is a transverse section in the line 1 2, Fig. IV. Fig. VII is a cross-section on the line 3 4, Fig. VI. Fig. VIII is a transverse section on the line 5 6, Fig. II; and Fig. IX is a transverse section on the line 7 8, Fig. II.

Similar letters refer to corresponding parts in the different figures.

This invention consists of a scrubber constructed, as fully described hereafter, so as to economize and facilitate the renewal and replacing of the gum strips, and enable the operator to impart any desired rigidity or flexibility to the strips.

The head-piece B consists of a central plate, from which extend two inclined flanges, *a a*, and at the center of the plate and perpendicular to the same is a socket for the reception of a handle, E.

From a strip, C, the sides of which are beveled to correspond with the inclined inner sides of the flanges *a a*, project screw-rods *g*, which extend through the head-piece B, and on the upper ends of which turn nuts H.

Between each inclined side of the strip C and the adjacent flange, *a*, is confined one edge of a strip, D, of rubber or other equivalent material.

This scrubber can be turned or reversed at pleasure, so as to make use of both the strips of gum or gutta-percha, inasmuch as the socket F and handle E are perpendicularly to the head-piece B, and as the two strips of gutta-percha are at the same angle to the central portion of the head-piece.

It will be seen that it is only necessary to turn the nuts H to release the strips C, or to secure them as firmly as may be desired, and that as each strip is confined between two parallel surfaces of considerable width, it will be much less flexible than if merely doubled over a rod secured in a recess, while less gum is required.

It will also be seen that when one edge of a strip becomes worn the strip may be reversed, so as to present a new edge for scrubbing, and that by inserting the strips to a greater or less extent between the confining-plates, so as to regulate the width of the projecting portion, they may be rendered as rigid or as flexible as may be desired, and one of the strips may project farther from the head than the other, to render the frequent adjustment of the strips unnecessary.

I claim as my invention and desire to secure by Letters Patent—

The scrubber constructed of the head B, having inclined projecting sides or flanges *a*, and a socket at its center, in a line perpendicular thereto, the independent rubber strips D, and the adjustable wedge B, whereby the strips are pressed against the flanges of the head at or about right angles to each other, so as to allow each strip to be presented at right angles to the floor, substantially as described, for the purpose specified.

JOSEPH OLD.

Witnesses:
GEORGE PRINTZ,
JOSEPH SHEARER.